United States Patent
Schleicher, II (10) Patent No.: US 7,587,686 B1
(45) Date of Patent: Sep. 8, 2009

(54) CLOCK GATING IN A STRUCTURED ASIC

(75) Inventor: James G. Schleicher, II, Los Gatos, CA (US)

(73) Assignee: Altera Corporation, San Jose, CA (US)

( * ) Notice: Subject to any disclaimer, the term of this patent is extended or adjusted under 35 U.S.C. 154(b) by 461 days.

(21) Appl. No.: 11/497,705

(22) Filed: Aug. 1, 2006

(51) Int. Cl.
*G06F 17/50* (2006.01)

(52) U.S. Cl. .................. 716/1; 716/16; 716/17
(58) Field of Classification Search .......... 716/1, 716/16–18; 328/38–40; 327/293; 326/38–40
See application file for complete search history.

(56) References Cited

U.S. PATENT DOCUMENTS

| | | |
|---|---|---|
| 7,194,718 B2 | 3/2007 | Sano et al. |
| 7,243,329 B2 | 7/2007 | Chua et al. |
| 7,275,232 B2 | 9/2007 | Schleicher, II et al. |
| 7,404,169 B2 | 7/2008 | Lim et al. |
| 2006/0001444 A1 | 1/2006 | Chua et al. |
| 2006/0129961 A1* | 6/2006 | Paul et al. ............ 716/6 |
| 2006/0164121 A1 | 7/2006 | Or-Bach et al. |
| 2006/0225008 A1 | 10/2006 | Schleicher et al. |
| 2006/0247875 A1 | 11/2006 | Ooshima |
| 2007/0013428 A1* | 1/2007 | Vadi et al. ............ 327/293 |
| 2007/0188188 A1* | 8/2007 | Or-Bach et al. ........ 326/38 |

* cited by examiner

*Primary Examiner*—Paul Dinh
(74) *Attorney, Agent, or Firm*—Townsend and Townsend and Crew LLP; David B. Raczkowski (57) ABSTRACT

Circuits and methods use clock gating to reduce power consumption in select parts of a structured ASIC. A clock distribution network includes a deterministic portion, a configurable portion, and one or more clock gating circuits. The deterministic portion employs a predetermined arrangement of conductor segments and buffers for distributing a clock signal and a clock enable signal to a plurality of predetermined locations on the device. A clock gating circuit, connected with the deterministic portion, may be placed at any of the predetermined locations, or at any location within predetermined areas associated with the predetermined locations. The clock gating circuit produces a gated clock signal output. A configurable portion and/or subportion distributes the gated clock signal output to logic elements. Depending on the value of the clock enable signal, operation of the logic elements may be suspended.

24 Claims, 8 Drawing Sheets

CLOCK GATING IN A STRUCTURED ASIC

CROSS-REFERENCES TO RELATED APPLICATIONS

This application is related to co-pending, commonly assigned, U.S. patent application Ser. No. 11/141,867) entitled "CLOCK SIGNAL NETWORKS FOR STRUCTURED ASIC DEVICES," filed on May 31, 2005, which is incorporated by reference herein for all purposes.

BACKGROUND

This invention relates to the field of application-specific integrated circuits (ASICs) and systems and methods of reducing power consumption in the same.

Clock gating can be used to "turn off" parts of a circuit to reduce the power consumption of a device. A clock signal passes through a logic circuit that can selectively block, or gate, the clock signal. When the clock signal is blocked, logic driven by the gated clock signal suspends operation and does not consume any dynamic power. The amount of power savings is related to the amount of logic that is effectively turned off. The higher the gating is done on the clock tree, a larger portion of the clock network is turned off and the more power is saved. If the clock is gated at the leaf-cell level (for example, immediately before the clock input to a register), very little power is saved because the whole clock network still toggles.

Structured ASICs are devices that have some predetermined circuit characteristics, but that are also customizable to some degree. For example, a structured ASIC may include a two-dimensional array (fabric) of many relatively small logic elements (referred to herein as hybrid logic elements or HLEs). The basic circuitry of these HLEs is always the same or substantially the same, and is provided by a subset of the masks that are used to make the structured ASIC. Accordingly, the masks in this subset can be always the same or substantially the same. The overall function(s) performed by an HLE can be customized to some extent by customizing one or more additional masks used to make a particular structured ASIC product. Similarly, connections to, from, and/or between HLEs can be customized by customizing additional masks used to make the product. Because the structured ASIC always has the same basic circuitry, the task of designing it to perform particular tasks is greatly simplified, speeded up, increased in reliability, and reduced in cost. An entire ASIC does not have to be designed "from scratch." Instead, only the customizable masks have to be designed.

A possible use of structured ASIC technology is to produce ASICs that are functionally equivalent to programmed field-programmable gate arrays ("FPGAs"). After a logic design has been adequately "proven" in an FPGA, the design may be "migrated" to a structured ASIC. In structured ASICs, the disposition (location or arrangement) of circuit functions (e.g., logic functions) on the structured ASIC can be quite different from the disposition of those functions on the FPGA to which the structured ASIC is supposed to be functionally equivalent. Thus, it may not be possible to simply duplicate on the structured ASIC the architecture of the related FPGA circuitry for routing, gating, or distributing clock signals to the functional circuitry. Accordingly, it is difficult to transport the efficacy of the FPGA clock gating circuitry to the structured ASIC. Additionally, designing completely customized clock gating circuitry for a structured ASIC is not a good approach because of the cost and complexity of the design task.

It is therefore desirable to have efficient methods and circuits for clock gating in a structured ASIC with minimal design effort.

BRIEF SUMMARY

Embodiments of the present invention provide methods, systems, and circuits for efficiently powering down or "turning off" parts of a structured application-specific integrated circuits (ASIC) with a clock distribution network. The clock distribution network has a deterministic portion for distributing one or more clock and clock enable signals to predetermined locations. A clock gating circuit associates with one predetermined location and connects with the deterministic portion of the clock distribution network. In some embodiments, the clock gating circuit is located at the predetermined location. The clock gating circuit produces a gated clock signal output based on a clock signal and a clock enable signal.

A configurable portion of the clock distribution network, which is connected with the clock gating circuit, distributes the gated clock signal output to a set of logic elements. The gated clock signal output may operate or suspend operation of the set of logic elements. When the first clock enable signal has a first value, the clock gating circuit produces a first gated clock signal, which operates the set of logic elements, in response to the clock signal. When the first clock enable signal has a second value, the clock gating circuit produces a second gated clock signal, which suppresses operation of the set of logic elements, in response to the first clock signal.

In some embodiments, the clock gating circuit and/or the logic elements are located at an area associated with the predetermined location. Each area associated with a predetermined location may contain subareas, at which the clock gating circuit and/or the logic elements may be located. The clock distribution network may have another configurable portion for connecting the first clock gating circuit with the deterministic portion of the clock distribution network. The connection may be done at the predetermined location. In one embodiment, a configurable portion has a configurable subportion for distributing a signal. A configurable subportion may be associated with an area or a subarea. In one embodiment, the areas and/or subareas are predetermined.

In another embodiment, the clock distribution network has a second clock gating circuit. The second clock gating circuit may be associated with a second predetermined location or with the same predetermined location as the first clock gating circuit. The second clock gating circuit also connects to the deterministic portion of the clock distribution network. The second clock gating circuit produces a second gated clock signal output based on a second clock signal and a second clock enable signal. The second clock signal and a second clock enable signal may be respectively the same or different signals than the clock and clock enable signals used by the first clock gating circuit.

In another embodiment, the structured ASIC has a two-dimensional array of logic elements. The logic elements of the array may be used to provide a clock gating circuit. In yet another embodiment, the clock distribution network of the ASIC mirrors the clock distribution network of a field-programmable gate array (FPGA). In one embodiment, the gated clock signal output of a clock gating circuit of the ASIC is fed to logic elements that perform the same function as a logic array block (LAB) of a field-programmable gate array (FPGA). In one embodiment, the clock distribution network maintains a one-one functional equivalence with a field-programmable gate array (FPGA). In another embodiment, the configurable portion of the clock distribution network is configured for a specific ASIC design using the structured ASIC and the deterministic portion is fixed for all designs using the structured ASIC.

In another embodiment, a configurable portion of the clock distribution network has not been configured. A clock gating circuit, associated with one predetermined location and connected with the deterministic portion of the clock distribution network, is adapted to produce a gated clock signal output based on a clock signal and a clock enable signal. A set of logic elements is capable of being operated by the configurable portion of the clock distribution network that can be configured to distribute the gated clock signal output from the clock gating circuit to the set of logic elements. When the first clock enable signal has a first value, the clock gating circuit produces a first gated clock signal, which is capable of operating the set of logic elements, in response to the clock signal. When the first clock enable signal has a second value, the clock gating circuit produces a second gated clock signal, which is capable of suppressing operation of the set of logic elements, in response to the first clock signal.

A better understanding of the nature and advantages of the present invention may be gained with reference to the following detailed description and the accompanying drawings.

BRIEF DESCRIPTION OF THE DRAWINGS

The invention will be described with reference to the drawings, in which.

DETAILED DESCRIPTION

Embodiments of the present invention are directed to clock gating circuitry to optimally "turn off" parts of a circuit to reduce the total power consumption of an ASIC. In some embodiments, the ASIC is functionally equivalent to an FPGA device. In one embodiment, clock gating is implemented while maintaining a strict one-to-one functional equivalence between the FPGA and the ASIC device. However, one skilled in the art will appreciate that embodiments of the invention may be applied to any structured ASIC device.

Figure 1A:
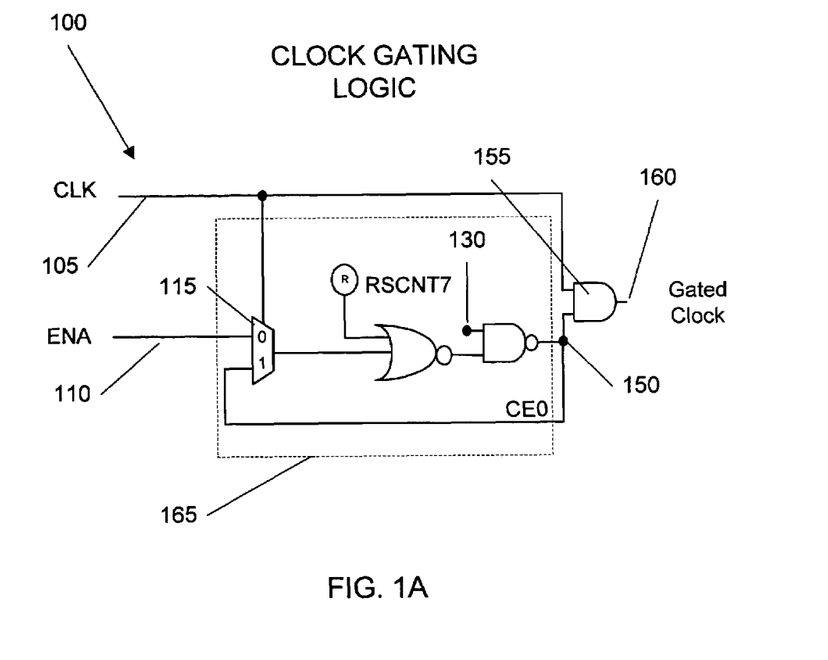
FIGS. 1A-1B illustrate an example schematic of a clock gating circuit and the associated timing diagram.

FIG. 1A illustrates an example circuit 100 of clock generation logic that gates the clock signal. The clock gating circuit 100 receives a clock signal CLK on line 105 and a clock enable ENA on line 110. The clock gating circuit 100 produces a gated clock signal on line 160. The gated clock signal and the clock signal are equal only if ENA is 1. If ENA=0, the gated clock signal will go low the next time the clock signal is low, and all rising clock edges will be suppressed until ENA is 1 again. This suppression is accomplished with the AND gate 155. The rest of the circuit 165 ensures that glitching does not occur due to timing mismatches of the CLK and ENA signals. The example schematic of circuit 100 is only illustrative of the type of clock gating circuits that may be used. For example, in some embodiments, it may prove useful to have the clock gating circuit 100 made from the HLEs of an ASIC, which may or may not have similar structure as the components of clock gating circuit 100.

Figure 1B:
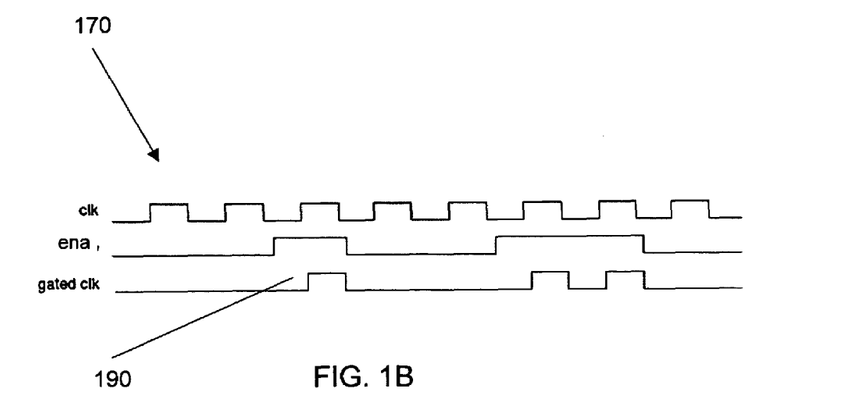

FIG. 1B illustrates the resulting timing diagram 170 of the clock gating circuit 100. Starting at the beginning of the timing diagram, both the ENA signal and the CLK signals are 0. Thus, the CLK signal chooses the 0 on the ENA signal with the multiplexer 115. If the bit of register R is 0, then the output of the NOR gate is 1. If the input 130 is set to 1, then the output of the NAND gate at line 150 is 0, as well as feedback CE0. Since both inputs to the AND gate 155 are 0, the gated clock signal is 0.

When CLK changes from 0→1, the gated clock signal stays 0 since the other input at line 150 is 0. The output of line 150 will stay 0 as follows. When the CLK changes from 0→1, the feedback line CE0 is chosen at the multiplexer 125. Since CE0 is still 0, the output of the NAND at line 150 will still be 0. Accordingly, the CLK signal change from 0→1 will be suppressed by the AND gate 155. If the ENA signal changes from 0→1 while the CLK signal is 1, the change will not effect the gated clock signal. The CE0 signal is still being chosen at multiplexer 125, and the CE0 line has not changed.

If the ENA signal changes from 0→1 while the CLK signal is 0, the multiplexer 125 chooses the ENA 1 signal. The output of the NOR gate will be 0, and the output of the NAND gate will be 1. When the CLK signal becomes 1, the gated clock signal will also become 1 as at edge 190 in FIG. 1B. Because CE0 is 1, the input at the AND gate stays 1 even when the CE0 line is chosen at multiplexer 125. Negative edges of a clock signal may be suppressed if an OR gate is used instead of AND gate 155.

Note that the clock gating circuit 100 can be disabled if the bit in register R is set to 1, or if the input on line 130 is set to 0. Either value may be from any type of memory, a global signal, or output of other logic. Since the clock signal CLK and the clock enable signal only produce a 1 when both signals are 1, the resulting gated CLK signal will trigger a device less often and only when needed. An example of such devices is a positive edge triggered flip-flop FF. Note that clock gating circuit 100 is not the best choice for a negative triggered FF. If the ENA input and the CE0 feedback input were switched at the multiplexer 115, then the clock gating circuit would be suitable for a negative edge triggered FF.

Figure 2:
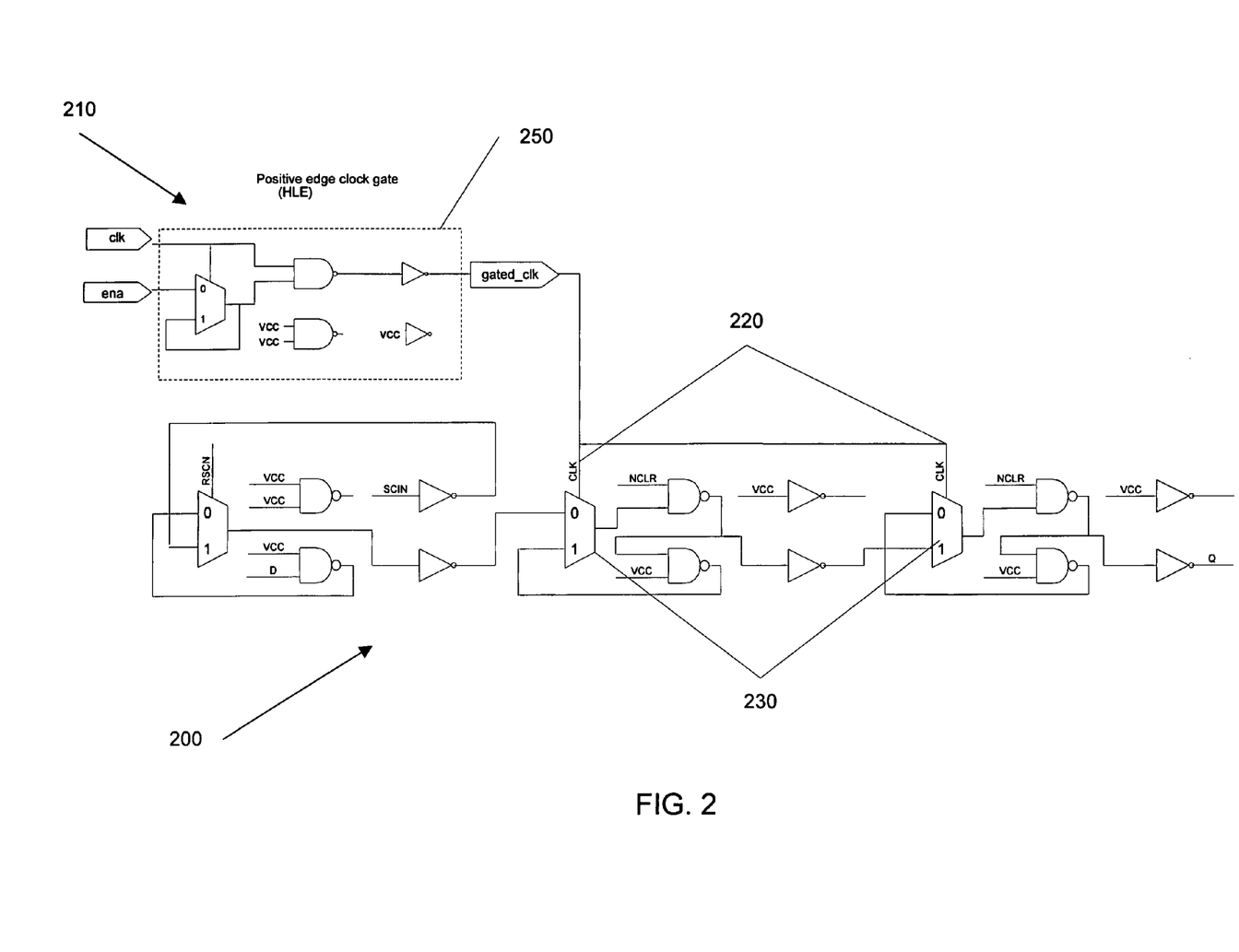
FIG. 2 illustrates an example schematic of a clock gating circuit coupled to a flip-flop circuit, which are made from HLEs.

FIG. 2 illustrates the use of a clock gating circuit 210 in conjunction with a flip-flop FF 200 with scan test input. The logic elements inside box 250 form a hybrid logic element (HLE) of the underlying fabric of the ASIC. One HLE is used to create the clock gating circuit 210, and three HLEs are used to create FF 200.

FIG. 2 is only illustrative of an example for HLEs, which can have varying configuration and arrangement from one ASIC to another. The FF circuitry 200 is an example of what is sometimes referred to herein as clock utilization circuitry. Other examples of clock utilization circuitry include a latch, retiming circuit, storage element, or FIFO device. The gated clock output of the clock gating circuit 210 is fed into the clock inputs 220 of the FF 200. As the 0→1 transitions of the clock signal may be suppressed, the multiplexers 230 are not activated during times of this edge suppression.

A benefit of the clock gating circuit 210 is to reduce power. This is achieved, for example, because (1) Load on the master clock is reduced and the number of required buffers in the clock tree is decreased. Therefore, the power dissipation of clock tree can be reduced; (2) The flip-flop receiving the derived clock is not triggered in idle cycles; The corresponding dynamic power dissipation is thus saved; and (3) The excitation function of the flip-flop triggered by a gated clock may be simplified since it has a don't care condition in the cycle when the flip-flop is not triggered by the gated clock. According to the design of FIG. 2, the clock gating circuit 210 is duplicated for every FF, and the clock enable signal must be distributed to every FF.

The power saving benefits are greater when the clock gating circuitry can control more than one logic element. If the design and function of the chip allows for large areas of the ASIC to not be used at any one time, the ASIC would greatly benefit from powering down the logic elements within an entire area. The structure of the clock gating circuitry to achieve substantial savings in power consumption will now be described.

Figure 3:
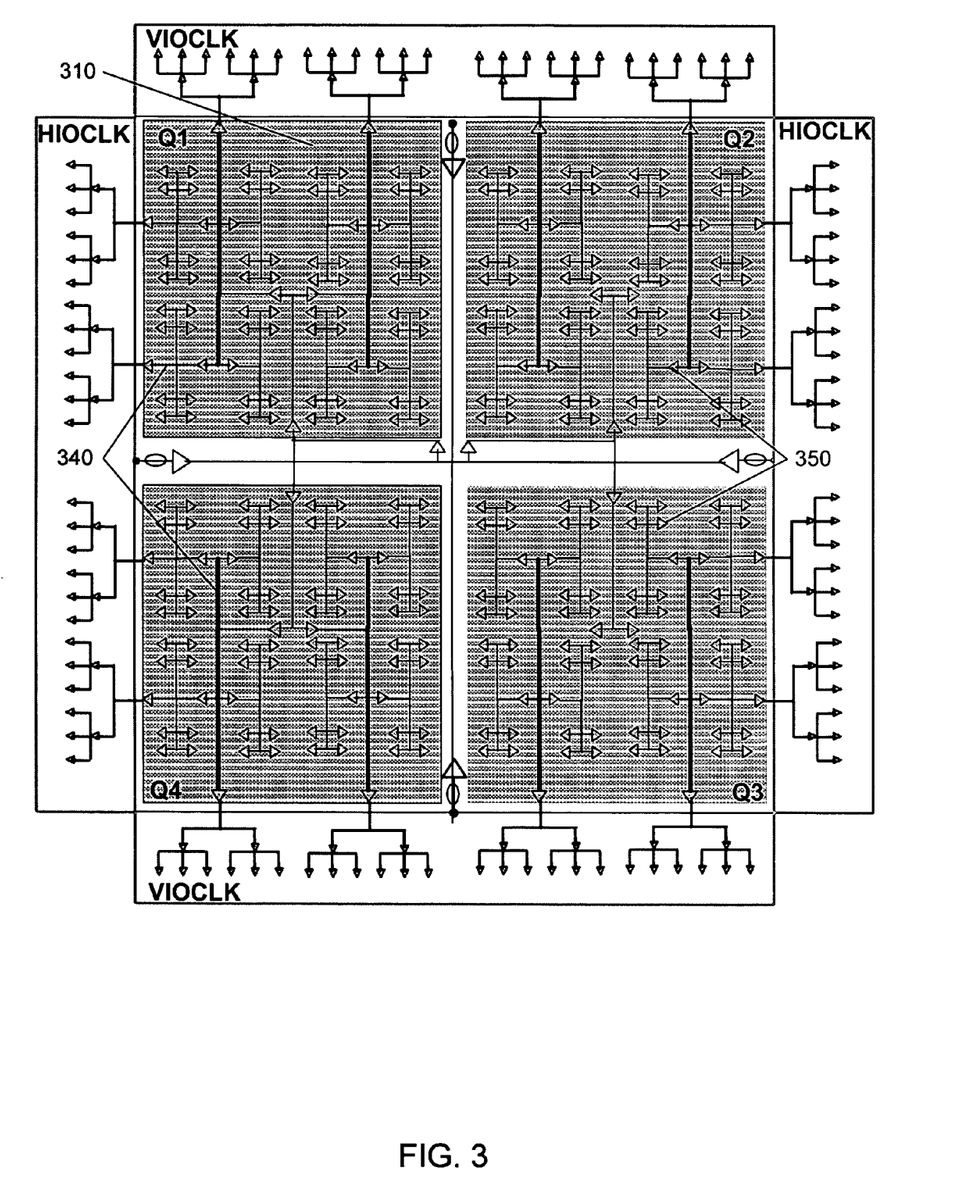
FIG. 3 illustrates an example clock distribution network of an ASIC.

FIG. 3 shows the clock network used for clock gating of an ASIC chip according to an embodiment of the invention. There are four quadrants Q1-Q4. The gray area 310 of each quadrant contains an array of HLEs, which used to create the functional design of the chip. Each quadrant is symmetrically related. FIG. 3 shows clock signal distribution conductors 340 and clock signal buffers 350, which may also process clock enable signals. Each buffer 350 may facilitate the distribution of clock and clock enable signals to clock utilization circuitry near it. In one embodiment, the buffers 350 may be made from the HLEs.

Each conductor line 340 in FIG. 3 may actually represent several parallel conductors that can be carrying different clock and clock enable signals. For example, there can be several so-called global clock or clock enable signals that are available on conductors 340 throughout the device. As another example, there may be various so-called local clock and clock enable signals that are available to only one quadrant, possibly to two edge-adjacent quadrants, or possibly to only part of a quadrant. Just as each line 340 may represent several parallel conductors, each buffer 350 may represent several instances of buffer circuitry, and each instance may serve respective conductors 340 entering and leaving the buffer location.

In one embodiment, the architecture shown in FIG. 3 generally follows a predetermined pattern, e.g., with regard to the locations of conductor segments 340 and buffers 350. The architecture may be used as the general framework for a clock distribution network of a whole set of ASICs. Accordingly, this portion may sometimes be referred to as the deterministic portion of the clock distribution network of this invention because this portion has a predetermined architecture or arrangement, such as the one shown in FIG. 3.

It will also be understood that although the circuitry 340 and 350 shown in FIG. 3 is basically deterministic, it is usable to achieve different clock distribution networks. For example, various conductors 340 in various portions of the depicted deterministic network can be connected with one another in various ways to distribute various clock and clock enable signals in many different ways. As an example of this, a particular global clock signal may not be needed in quadrant Q2 and would not need to be connected into the further clock distribution circuitry of Q2. If desired, conductor segments 340 that are not used for clock distribution can be used instead for other purposes such as power distribution. Alternatively, conductor segments 340 and associated buffers 350 that are not used for clock or clock enable distribution can be used for high fanout data signal distribution. As still another possibility, buffers 350 that are not used for clock distribution and that are made from HLEs (see below) can be used for other purposes such as in logic.

It will also be understood that FIG. 3 shows only one illustrative embodiment of the deterministic circuitry, and that other embodiments with different predetermined architectures, geometries, or arrangements are also possible. For example, some conductor segments 340 may be omitted or moved in some structured ASICs. Similarly, some buffers 350 may be omitted or moved. Additionally, other ASIC architectures may use any arbitrary partitioning of HLEs, rather than the partitioning of HLEs into four quadrants as shown in FIG. 3.

Use of this deterministic circuitry has a number of important advantages in the present context. For example, it simplifies the task of designing clock circuitry that may need to deliver a clock signal to an HLE that is virtually anywhere. For most ASIC designs, only a final portion of the clock distribution circuitry from the deterministic circuitry to one or more HLEs needs to be designed in a more ad hoc, less deterministic way. This portion is referred to as the configurable portion of the clock distribution network. As another example, the deterministic clock distribution circuitry can be pre-designed to always meet various objectives regarding such matters as generally optimal clock gating, permissible clock signal delay, permissible clock signal skew (differential delay to different parts of the clock distribution network), etc.

The configurable portions of the clock distribution circuitry, from buffers 350 to individual HLEs, are typically kept relatively small. The size of a configurable portion may be controlled by limiting the number or the area of the HLEs that use clock distribution circuitry from a buffer 350. In some embodiments, the number or area of the HLEs connected with a single configurable portion from a buffer 350 is predetermined. If the area of HLEs is relatively small, these portions do not significantly alter operating characteristics such as permissible clock signal delay, permissible skew, etc. Also, if the area of HLEs is of suitable size, clock gating circuitry, which powers down the whole area, may be implemented at the point of a buffer 350. This aspect of the invention will be discussed more later.

Figure 4:
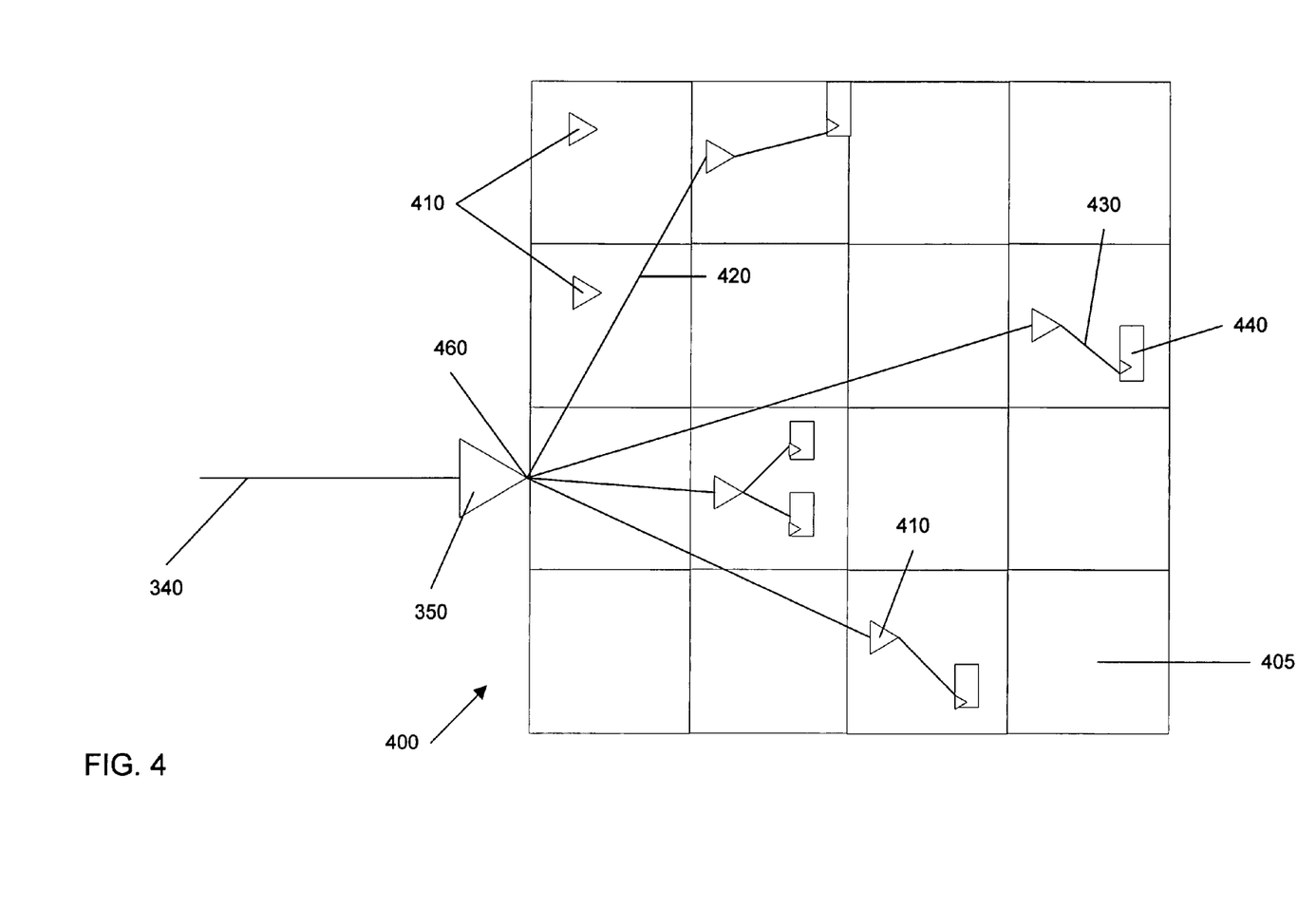
FIG. 4 illustrates a simplified schematic block diagram of circuitry used in accordance with an embodiment of the invention.

FIG. 4 shows the final conductor leg 340 and final buffer 350 in a representative part of the deterministic clock distribution circuitry shown in FIG. 3. Conductor leg 340 may carry both a clock signal and a clock enable signal. Circuitry like that shown in FIG. 4 to the right of connection 460 is a configurable portion of the clock distribution network. In an embodiment, the area 400 may be a predetermined area associated with a particular location of conductor 340 and buffer 350. Area 400 may contain subareas or subgroups 405, each of which contain HLEs.

In some embodiments, buffers 410 like buffers 350 may be implemented using circuitry of an HLE within the subgroup 405 that includes that buffer 410. Also, if a subgroup 405 does not need the output signal of depicted buffer 350, then the buffer HLE in that subgroup can be completely released for other service (e.g., for use in logic). The possible buffers 410 in the left-hand column of subgroups 405 in FIG. 4 are examples of HLE buffers that are not needed and can therefore be used for other purposes.

Circuitry like that shown in FIG. 4 is referred to as configurable because buffers 410 and conductors 420 and 430 are provided only when, where, and in the numbers actually needed in a particular structured ASIC product. For example, the routing of conductors 420 can vary from product to product. Although shown as single straight lines in FIG. 4, each conductor 420 may actually be made up of two or more segments at right angles or any other angles to one another. The same is true for conductors 430.

There may be minor aspects of the circuitry shown in FIG. 4 that are somewhat deterministic. For example, the location of connection 460 relative to area 400 may be predetermined, and/or the locations of buffers 410 in subgroups 405 may be predetermined. In general, however, the FIG. 4 circuitry is predominantly configurable (i.e., not predetermined) and therefore at least potentially quite different from one structured ASIC product to the next, even though all of those products follow the same general plan in their deterministic respects.

It will be understood that the foregoing is only illustrative of the principles of the invention, and that various modifications can be made by those skilled in the art without departing from the scope and spirit of the invention. As another example, the number of subgroups 405 in area 400 can be different from the number shown in FIG. 4. Different numbers of HLEs can be included in each subgroup 405 in structured ASICs having different general plans.

The predetermined portion and the configurable portion of the clock distribution circuitry may be employed to develop clock gating circuitry according to an embodiment of the invention. Clock gating circuits, such as 100 found in FIG. 1, may be created from the HLE fabric of the ASIC and positioned at optimal points in the clock tree.

Figure 5:
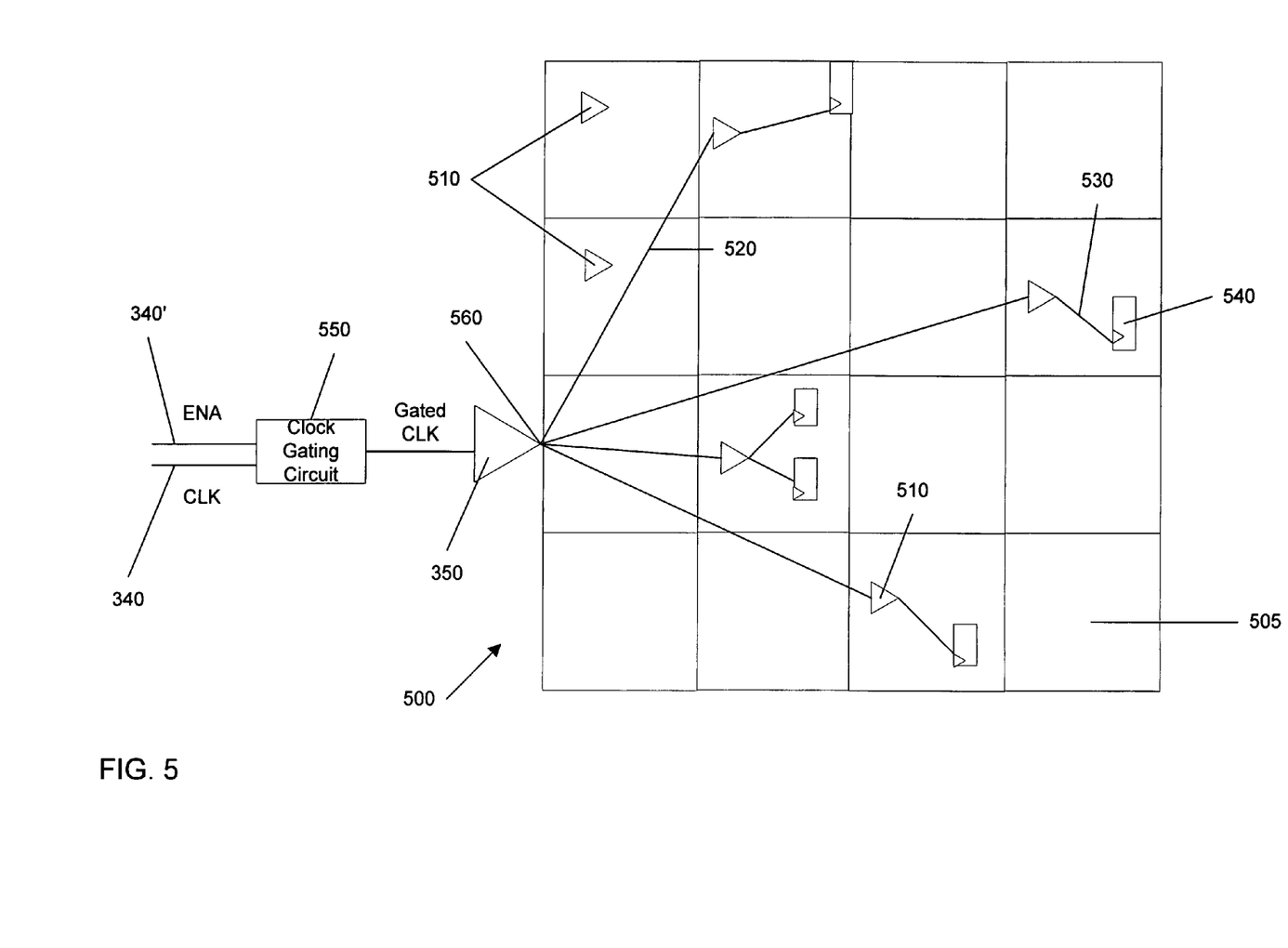
FIG. 5 illustrates clock gating circuitry according to an embodiment of the invention.

FIG. 5 illustrates clock gating circuitry according to an embodiment of the invention. Similar reference numbers as in FIG. 4 are used for the same references of FIG. 5. To highlight the clock gating configuration, the clock and the clock gating signals are shown on respective conductors 340 and 340'.

In one embodiment, a clock gating circuit 550 is coupled with the buffer 350, which is associated with area 500. The clock gating circuit 550 may be placed before or after the buffer 350. Typically, the output of clock gating circuit 550 is buffered. FIG. 5 shows a placement of the clock gating circuit 550 before the buffer 350. In this embodiment, the buffer 350 only receives the gated clock signal. In the configuration of FIG. 5, a clock enable signal of 0 will suppress an edge of the clock signal and effectively power down all of the clock utilization circuitry of area 500, which is associated with buffer 350. In one embodiment, the clock utilization circuit is made from the HLE fabric.

In another embodiment, conductor 520 of the configurable portion may transmit a gated clock signal to another deterministic portion, which carries the gated clock signal to a set of logic elements. Accordingly, a clock gating circuit may be placed at any point within the deterministic portion, where the clock gating circuit or associated buffers may be made out of the configurable portion.

Figure 6:
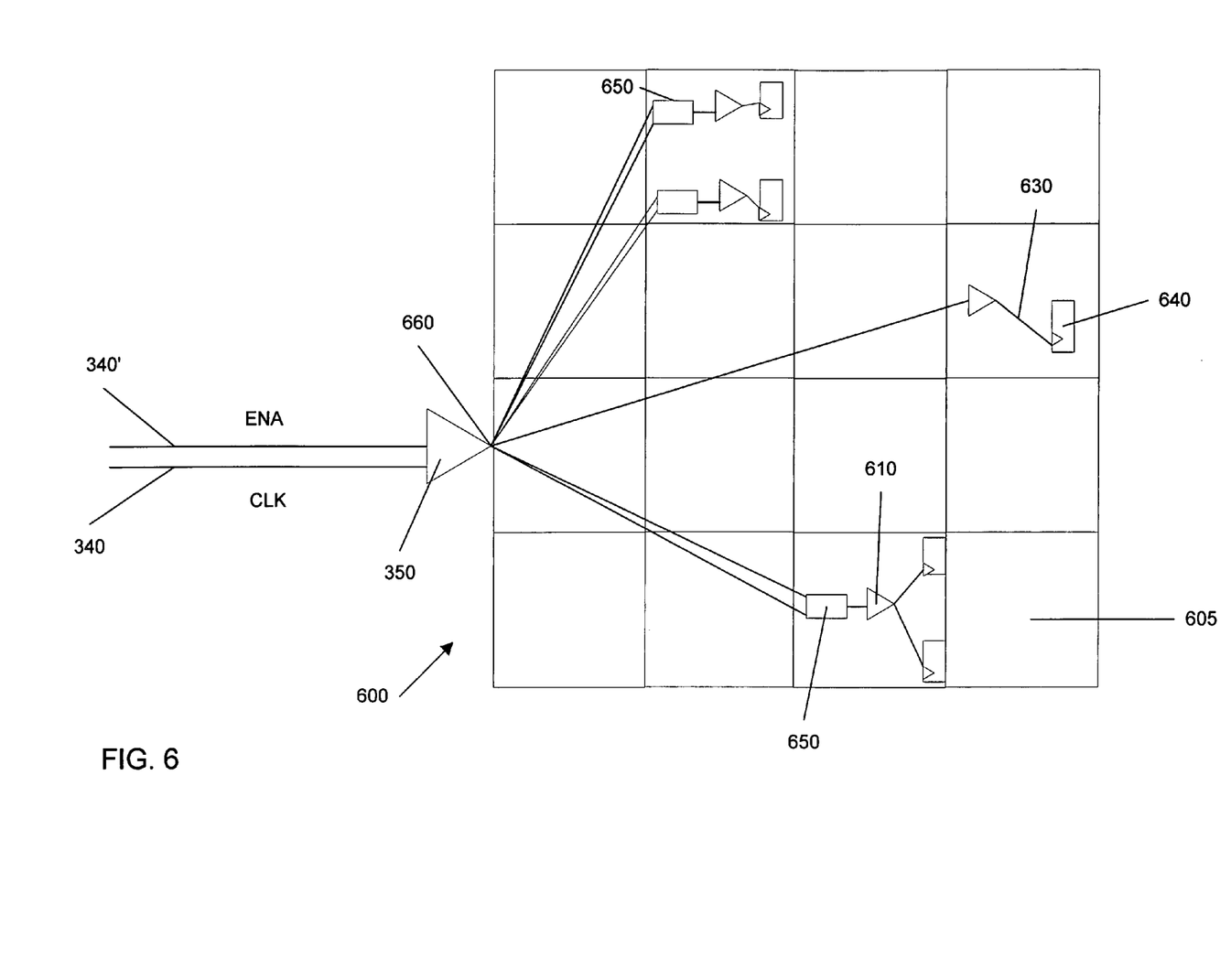
FIG. 6 illustrates clock gating circuitry according to another embodiment of the invention.

FIG. 6 shows clock gating circuitry according to another embodiment of the invention. In one embodiment, clock gating circuits 650 are coupled to buffer 610 within a their respective subgroups 605, instead of being coupled to buffer 350. In one embodiment, a clock gating circuit 650 can power down the clock utilization circuitry of a subgroup 605. In other embodiments, one or more separate clock gating circuits 650 may exist within a subgroup 605. Each clock gating circuit 650 may receive different clock enable signals. Additionally, each clock gating circuit 650 may be configured differently or be composed of different logic elements. For example, one clock gating circuit may be configured for positive edges and another clock gating circuit may be configured for negative edges. In this situation, the positive and negative edge clock gating circuits may receive different clock enable signals. Also, the clock gating circuit 650 may be placed before buffer 610.

In some embodiments, a different clock enable signal may be sent to the different clock gating circuits 650. In this manner, the clock utilization circuitry of different subgroups 605 may be powered down at different times. In another manner, different clock utilization circuits of the same subgroup may receive different clock enable signals, and thus different parts of a subgroup may be powered down at different times. Additionally, any configuration with a clock gating circuit coupled to a buffer 610 may exist in a configuration with a clock gating circuit coupled to buffer 350 as shown in FIG. 5.

The creation and placement of the clock gating circuit could be done as a post-process after configuration of the HLEs to perform a specific function on an ASIC to reduce dynamic power opportunistically. In another embodiment, the configuration of the HLEs can be done with an awareness of the capabilities of the clock gating circuitry to optimize the dynamic power consumption of the ASIC configuration. By making the placement tools aware of this optimization, designers can organize the placement of clock utilization circuitry such that large amounts of the clock network may be disabled. Designers could also use floorplanning techniques to create regions of registers with common clock enable controls to improve the dynamic power optimization for their designs.

In some embodiments, it may be desirable to utilize existing clock gating knowledge from the corresponding FPGA design from which the ASIC is derived. Additionally, some embodiments may implement the clock gating of the ASIC derived from an FPGA, such that a strict one-one functional equivalence is maintained. For example, the clock gating of the ASIC can use the clock gating circuitry described above, such that the clock gating is handled in a similar fashion as for the prototyped FPGA.

Figure 7:
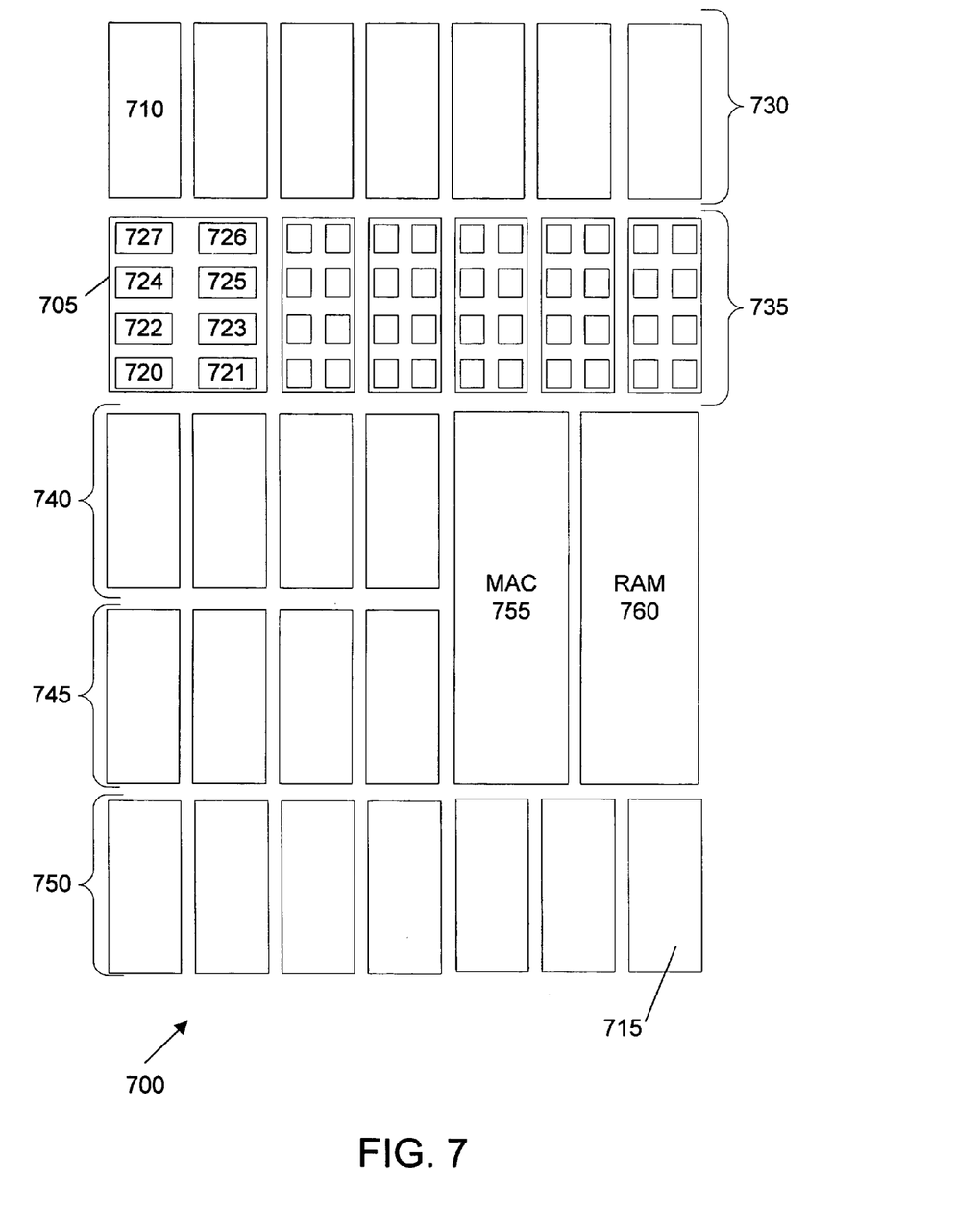
FIG. 7 illustrates a programmable device from which an ASIC processed with an embodiment of the invention may be functionally equivalent.

FIG. 7 illustrates a programmable device 700. Programmable device 700 includes a number of logic array blocks (LABs), such as LABs 705, 710, 715. Each LAB includes a number of programmable logic cells using logic gates and/or look-up tables to perform a logic operation. LAB 705 illustrates in detail logic cells 720, 721, 722, 723, 724, 725, 726, and 727. Logic cells are omitted from other LABs in FIG. 7 for clarity. The LABs of device 700 are arranged into rows 730, 735, 740, 745, and 750. In an embodiment, the arrangement of logic cells within a LAB and of LABs within rows provides a hierarchical system of configurable connections, in which connections between logic cells within a LAB, between cells in different LABs in the same row, and between cells in LABs in different rows require progressively more resources and operate less efficiently.

In addition to logic cells arranged in LABs, programmable device 700 also includes specialized functional blocks, such as multiply and accumulate block (MAC) 755 and random access memory block (RAM) 760. For clarity, the portion of the programmable device 700 shown in FIG. 7 only includes a small number of logic cells, LABs, and functional blocks. Typical programmable devices will include thousands or tens of thousands of these elements.

Figure 8:
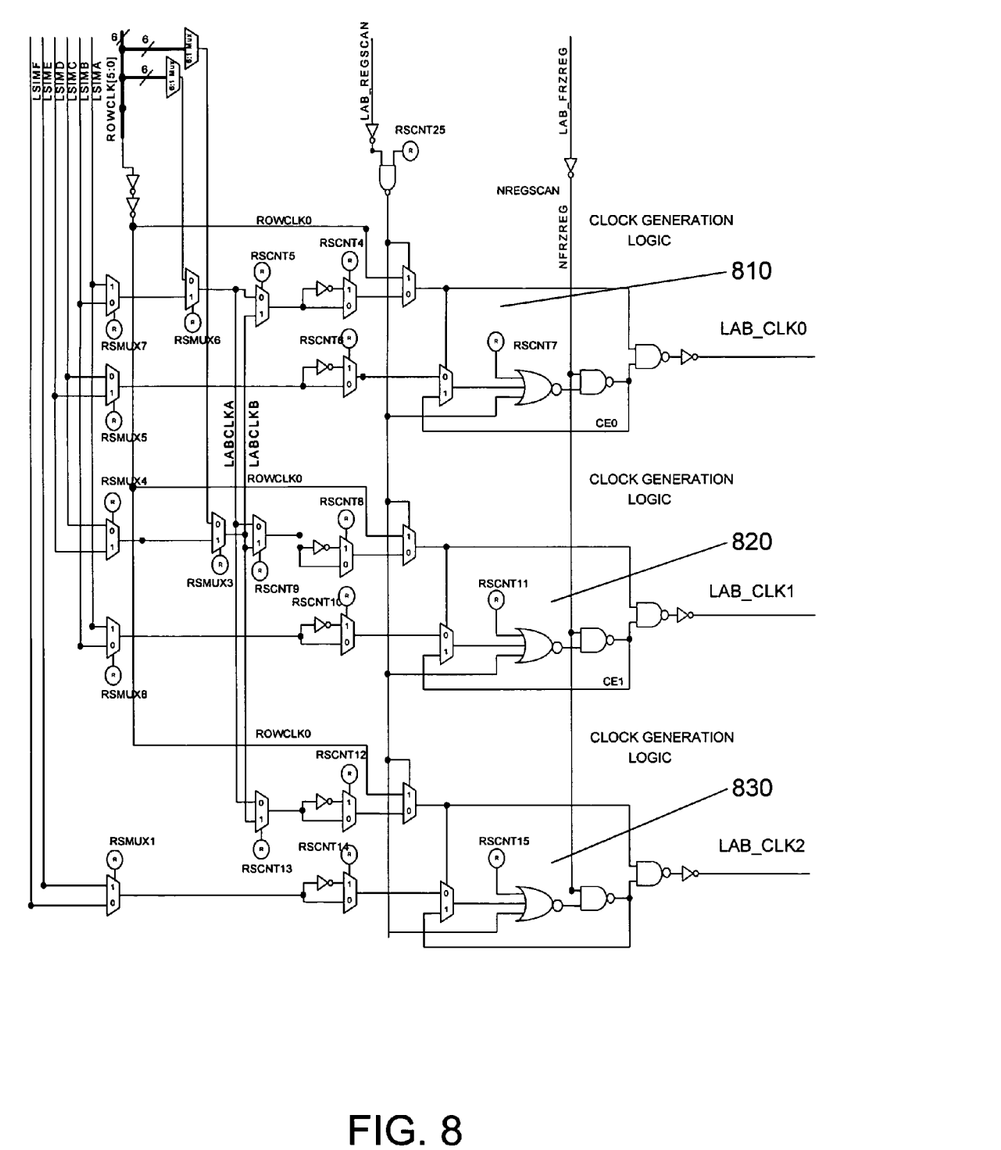
FIG. 8 illustrates an example of clock gating layout of a programmable device of FIG. 7.

FIG. 8 shows the clock gating and generation logic for a LAB of FIG. 7. There are three separate clock generation and gating circuits 810, 820, and 830. These circuits are in the secondary logic, which may be associated with each LAB. Each circuit resembles the clock gating circuit 100 of FIG. 1. The outputs LAB_CLK0-2 of each clock gating circuit 810, 820, and 830 goes to the logic elements of the LAB.

With the deterministic portion of FIG. 3, the clock gating of the FPGA can be copied, and thus the ASIC can be made while maintaining a strict one-one functional equivalence between the two devices. For example, even though the exact placement of the HLEs that perform the function of the LAB is not known, the HLEs will generally be in close proximity to each other. Thus, the clock signals to the HLEs corresponding to a LAB will go through the same fanout point allowing a clock gating circuit at the fanout point to gate the clock signal to the HLEs.

If the same fanout point also feeds clock utilization circuitry other than that associated with the LAB, then it may not be possible to use a clock gating circuit at the fanout point. However, the configurable aspect of the clock gating circuitry may then be used to place clock gating circuits such that only the clock utilization circuitry of the LAB receives the proper gated lock signal. Thus, the clock gating circuitry may be used to power down a specific set of HLEs corresponding to a specific function.

Further embodiments can be envisioned to one of ordinary skill in the art after reading the attached documents. For example, one or more clock enable signals may be easily distributed to different parts of an ASIC using the deterministic and configurable portions, thus allowing flexible clock gating. Additionally, the clock gating circuitry may be created to mimic and use the knowledge of any device from which the ASIC is derived.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A clock distribution network for a structured ASIC, the clock distribution network comprising:
   a deterministic portion of the clock distribution network that distributes at least one clock signal and at least one clock enable signal to a plurality of predetermined locations on the structured ASIC;
   a first clock gating circuit associated with a first of the plurality of predetermined locations and connected with the deterministic portion of the clock distribution network, wherein the first clock gating circuit produces a first gated clock signal output based on a first clock signal and a first clock enable signal; and
   a first configurable portion of the clock distribution network connected with the first clock gating circuit, wherein the first configurable portion distributes the first gated clock signal output to a first set of logic elements, wherein the first gated clock signal output includes:
      a first gated clock signal in response to the first clock signal when the first clock enable signal has a first value, wherein the first gated clock signal operates the first set of logic elements; and
      a second gated clock signal in response to the first clock signal when the first clock enable signal has a second value, wherein the second gated clock signal suppresses operation of the first set of logic elements,
   wherein the structured ASIC includes a two-dimensional array of logic elements, and wherein logic elements of the array are customizable to provide the first clock gating circuit and are customizable to provide the first set of logic elements that receive the first gated clock signal.

2. A clock distribution network for a structured ASIC, the clock distribution network comprising:
   a deterministic portion of the clock distribution network that distributes at least one clock signal and at least one clock enable signal to a plurality of predetermined locations on the structured ASIC;
   a first clock gating circuit associated with a first of the plurality of predetermined locations and connected with the deterministic portion of the clock distribution network, wherein the first clock gating circuit produces a first gated clock signal output based on a first clock signal and a first clock enable signal; and
   a first configurable portion of the clock distribution network connected with the first clock gating circuit, wherein the first configurable portion distributes the first gated clock signal output to a first set of logic elements, wherein the first gated clock signal output includes:
      a first gated clock signal in response to the first clock signal when the first clock enable signal has a first value, wherein the first gated clock signal operates the first set of logic elements; and
      a second gated clock signal in response to the first clock signal when the first clock enable signal has a second value, wherein the second gated clock signal suppresses operation of the first set of logic elements,
   wherein the first clock gating circuit and the first set of logic elements are located at a first area associated with the first predetermined location and further comprising a second configurable portion of the clock distribution network for connecting the first clock gating circuit with the deterministic portion of the clock distribution network.

3. A clock distribution network for a structured ASIC, the clock distribution network comprising:
   a deterministic portion of the clock distribution network that distributes at least one clock signal and at least one clock enable signal to a plurality of predetermined locations on the structured ASIC;
   a first clock gating circuit associated with a first of the plurality of predetermined locations and connected with the deterministic portion of the clock distribution network, wherein the first clock gating circuit produces a first gated clock signal output based on a first clock signal and a first clock enable signal;
   a first configurable portion of the clock distribution network connected with the first clock gating circuit, wherein the first configurable portion distributes the first gated clock signal output to a first set of logic elements, wherein the first gated clock signal output includes:
      a first gated clock signal in response to the first clock signal when the first clock enable signal has a first value, wherein the first gated clock signal operates the first set of logic elements; and
      a second gated clock signal in response to the first clock signal when the first clock enable signal has a second value, wherein the second gated clock signal suppresses operation of the first set of logic elements;
   a second clock gating circuit associated with a second of the plurality of predetermined locations and connected with the deterministic portion of the clock distribution network, wherein the second clock gating circuit produces a second gated clock signal output based on a second clock signal and a second clock enable signal; and a second configurable portion of the clock distribution network connected with the second clock gating circuit, wherein the second configurable portion distributes the second gated clock signal output to a second set of logic elements, wherein the second gated clock signal output includes:

a third gated clock signal in response to the second clock signal when the second clock enable signal has a first value, wherein the third gated clock signal operates the second set of logic elements; and a fourth gated clock signal in response to the second clock signal when the second clock enable signal has a second value, wherein the fourth gated clock signal suppresses operation of the second set of logic elements.

4. A clock distribution network for a structured ASIC, the clock distribution network comprising:

a deterministic portion of the clock distribution network that distributes at least one clock signal and at least one clock enable signal to a plurality of predetermined locations on the structured ASIC;

a first clock gating circuit associated with a first of the plurality of the predetermined locations and connected with the deterministic portion of the clock distribution network, wherein the first clock gating circuit produces a first gated clock signal output based on a first clock signal and a first clock enable signal;

a first configurable portion of the clock distribution network connected with the first clock gating circuit, wherein the first configurable portion distributes the first gated clock signal output to a first set of logic elements, wherein the first gated clock signal output includes:

a first gated clock signal in response to the first clock signal when the first clock enable signal has a first value, wherein the first gated clock signal operates the first set of logic elements; and a second gated clock signal in response to the first clock signal when the first clock enable signal has a second value, wherein the second gated clock signal suppresses operation of the first set of logic elements;

a second clock gating circuit associated with the first predetermined location and connected with the deterministic portion of the clock distribution network, wherein the second clock gating circuit produces a second gated clock signal output based on a second clock signal and a second clock enable signal; and a second configurable portion of the clock distribution network connected with the second clock gating circuit, wherein the second configurable portion distributes the second gated clock signal output to a second set of logic elements, wherein the second gated clock signal output includes:

a third gated clock signal in response to the second clock signal when the second clock enable signal has a first value, wherein the third gated clock signal operates the second set of logic elements; and a fourth gated clock signal in response to the second clock signal when the second clock enable signal has a second value, wherein the fourth gated clock signal suppresses operation of the second set of logic elements.

5. The clock distribution network of claim 4, further comprising a second deterministic portion of the clock distribution network connected with the first configurable portion of the clock distribution network, wherein the second deterministic portion also distributes the first gated clock signal output to the first set of logic elements.

6. The clock distribution network of claim 4, wherein the first configurable portion is configured for a specific ASIC design using the structured ASIC and wherein the deterministic portion is fixed for all designs using the structured ASIC.

7. The clock distribution network of claim 4, wherein the first set of logic elements performs the same function as a logic array block (LAB) of a field-programmable gate array (FPGA).

8. The clock distribution network of claim 4, wherein the first set of logic elements comprise a flip-flop.

9. The clock distribution network of claim 4, further comprising:

a plurality of clock gating circuits associated with any of the plurality of predetermined locations, wherein each clock gating circuit produces a gated clock signal output.

10. The clock distribution network of claim 9, wherein the clock distribution network maintains a one-one functional equivalence with a field-programmable gate array (FPGA).

11. The clock distribution network of claim 4, wherein the first clock gating circuit is located at the first predetermined location.

12. The clock distribution network of claim 4, wherein the second clock signal is the first clock signal.

13. A method of suppressing operation of at least a portion of a structured ASIC, the method comprising:

distributing, via a deterministic portion of a clock distribution network of the structured ASIC, at least one clock signal and at least one clock enable signal to a plurality of predetermined locations on the structured ASIC;

receiving a first clock signal and a first clock enable signal by a first clock gating circuit associated with a first of a plurality of predetermined locations;

producing a first gated clock signal output from the first clock gating circuit based on the first clock signal and the first clock enable signal;

distributing, via a first configurable portion of the clock distribution network connected with the first clock gating circuit, the first gated clock signal output to a first set of logic elements, wherein the first gated clock signal output includes:

a first gated clock signal in response to the first clock signal when a first clock enable signal has a first value, wherein the first gated clock signal operates the first set of logic elements; and a second gated clock signal in response to the first clock signal when the first clock enable signal has a second value, wherein the second gated clock signal suppresses operation of the first set of logic elements;

receiving a second clock signal and a second clock enable signal by a second clock gating circuit associated with a second of a plurality of predetermined locations;

producing a second gated clock signal output from the second clock gating circuit based on the second clock signal and the second clock enable signal; and distributing, via a second configurable portion of the clock distribution network connected with the second clock gating circuit, the second gated clock signal output to a second set of logic elements, wherein the second gated clock signal output includes:

a third gated clock signal in response to the second clock signal when a second clock enable signal has a first value, wherein the third gated clock signal operates the second set of logic elements; and a fourth gated clock signal in response to the second clock signal when the second clock enable signal has a second value, wherein the fourth gated clock signal suppresses operation of the second set of logic elements.

14. A method of suppressing operation of at least a portion of a structured ASIC, the method comprising:

distributing, via a deterministic portion of a clock distribution network of the structured ASIC, at least one clock signal and at least one clock enable signal to a plurality of predetermined locations on the structured ASIC;

receiving a first clock signal and a first clock enable signal by a first clock gating circuit associated with a first of a plurality of predetermined locations;

producing a first gated clock signal output from the first clock gating circuit based on the first clock signal and the first clock enable signal;

distributing, via a first configurable portion of the clock distribution network connected with the first clock gating circuit, the first gated clock signal output to a first set of logic elements, wherein the first gated clock signal output includes:
a first gated clock signal in response to the first clock signal when a first clock enable signal has a first value, wherein the first gated clock signal operates the first set of logic elements; and
a second gated clock signal in response to the first clock signal when the first clock enable signal has a second value wherein the second gated clock signal suppresses operation of the first set of logic elements;

receiving a second clock signal and a second clock enable signal by a second clock gating circuit associated with the first predetermined location;

producing a second gated clock signal output from the second clock gating circuit based on the second clock signal and the second clock enable signal; and distributing, via a second configurable portion of the clock distribution network connected with the second clock gating circuit, the second gated clock signal output to a second of the at least a portion of logic elements, wherein the second gated clock signal output includes:
a third gated clock signal in response to the second clock signal when a second clock enable signal has a first value, wherein the third gated clock signal operates the logic elements within the first predetermined area; and
a fourth gated clock signal in response to the second clock signal when the second clock enable signal has a second value, wherein the fourth gated clock signal suppresses operation of the logic elements within the first predetermined area.

15. The method of claim 14, further comprising:
configuring the first configurable portion for a specific ASIC design using the structured ASIC, wherein the deterministic portion is fixed for all designs using the structured ASIC.

16. The method of claim 14, wherein the structured ASIC includes a two-dimensional array of logic elements, and wherein logic elements of the array are used to provide the first clock gating circuit.

17. The method of claim 14, wherein the first set of logic elements performs the same function as a logic array block (LAB) of a field-programmable gate array (FPGA).

18. The method of claim 14, wherein the first set of logic elements comprise a flip-flop.

19. The method of claim 14, further comprising:
producing a plurality of clock gating signal outputs from a plurality of clock gating circuits, each associated with any of the plurality of predetermined locations.

20. The method of claim 19, further comprising maintaining a one-one functional equivalence with a field-programmable gate array (FPGA).

21. The method of claim 14, wherein the first clock gating circuit is located at the first predetermined location.

22. The method of claim 14, wherein the first clock gating circuit and the first set of logic elements are located at a first area associated with the first predetermined location and further comprising distributing, via a second configurable portion of the clock distribution network, the first clock signal and the first clock enable signal from the deterministic portion of the clock distribution network to the first clock gating circuit.

23. The method of claim 14, wherein the second clock signal is the first clock signal.

24. The clock distribution network of claim 4, wherein the second clock gating circuit includes one or more logic elements of the first set of logic elements.

* * * * *

UNITED STATES PATENT AND TRADEMARK OFFICE
CERTIFICATE OF CORRECTION

PATENT NO. : 7,587,686 B1
APPLICATION NO. : 11/497705
DATED : September 8, 2009
INVENTOR(S) : James G. Schleicher, II It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Twenty-first Day of September, 2010

David J. Kappos
*Director of the United States Patent and Trademark Office*